United States Patent
Anderson (10) Patent No.: US 10,262,464 B2
(45) Date of Patent: Apr. 16, 2019

(54) DYNAMIC, LOCAL AUGMENTED REALITY LANDMARKS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 15/395,222

(22) Filed: Dec. 30, 2016

(65) Prior Publication Data
US 2018/0190023 A1     Jul. 5, 2018

(51) Int. Cl.
| G06T 19/00 | (2011.01) |
| G06T 7/13 | (2017.01) |
| G06T 7/90 | (2017.01) |
| G06T 7/70 | (2017.01) |
| G06T 7/20 | (2017.01) |
| G06T 7/246 | (2017.01) |

(52) U.S. Cl.
CPC ............. *G06T 19/006* (2013.01); *G06T 7/13* (2017.01); *G06T 7/20* (2013.01); *G06T 7/246* (2017.01); *G06T 7/70* (2017.01); *G06T 7/90* (2017.01); *G06T 2207/10016* (2013.01); *G06T 2207/10024* (2013.01)

(58) Field of Classification Search
CPC .......... G06T 19/006; G06T 7/70; G06T 7/13; G06T 7/90; G06T 7/20; G06T 7/246; G06T 2207/10024; G06T 2207/10016
See application file for complete search history.

(56) References Cited

U.S. PATENT DOCUMENTS

| 6,064,749 A | 5/2000 | Hirota et al. |
| 2012/0224068 A1* | 9/2012 | Sweet, III ............... G06K 9/32 348/169 |
| 2012/0249741 A1* | 10/2012 | Maciocci ............... G06F 3/011 348/46 |

(Continued)

FOREIGN PATENT DOCUMENTS

| EP | 2966863 | 1/2016 |
| KR | 1020150039233 | 4/2015 |

(Continued)

OTHER PUBLICATIONS

"International Application Serial No. PCT US2017 063744, International Search Report dated Mar. 8, 2018", 8 pgs.

(Continued)

*Primary Examiner* — William A Beutel
(74) *Attorney, Agent, or Firm* — Schwegman Lundberg & Woessner, P.A.

(57) ABSTRACT

In some embodiments, the disclosed subject matter involves a system and method relating to dynamically sending local visual landmark information from multiple end user devices to a central server that is controlling an augmented reality (AR) experience. The local landmarks enable better alignment of the AR representations across devices. Multiple players may dynamically synchronize on shared landmarks that "anchor" the AR experience. The landmarks may be dynamic, transitory, and do not require pre-modelling of a location. Other embodiments are described and claimed.

24 Claims, 6 Drawing Sheets

(56) References Cited

U.S. PATENT DOCUMENTS

2015/0279106 A1* 10/2015 Blanchflower ......... G06T 15/20
                                                              345/2.2

FOREIGN PATENT DOCUMENTS

| KR | 1020150126938 | 11/2015 | |
|---|---|---|---|
| WO | WO-2015050288 A1 * | 4/2015 | ............ G06Q 10/10 |
| WO | 2016057433 | 4/2016 | |

OTHER PUBLICATIONS

"International Application Serial No. PCT US2017 063744, Written Opinion dated Mar. 8, 2018", 10 pgs.
Taketomi, Takafumi, et al., "Real-time camera position and posture estimation usign a feature landmark database with priorities", international conference on pattern recognition. http://citeseerx.ist.psu.edu/viewdoc/download?doi=10.1.1.214.4004&rep=rep1&type=pdf, (Jun. 2008), 1-4.
You, Suva, et al., "Orientation Tracking for Outdoor Augmented Reality Registration", IEEE Computer Graphics and Applications, http://graphics.usc.edu/cgit/publications/papers/CGA1999.pdf, (1999) 36-42.

* cited by examiner

DYNAMIC, LOCAL AUGMENTED REALITY LANDMARKS

TECHNICAL FIELD

An embodiment of the present subject matter relates generally to augmented reality (AR) systems, and more specifically, to using local landmarks to enable user devices to align their AR representations dynamically to the same landmark.

BACKGROUND

Various mechanisms exist for aligning augmented reality (AR) content. Existing AR systems use static models of locations to allow alignment of AR content. For example, the system may have an image of a building-front modelled in the system, which allows matching from end user devices to align AR content. A virtually presented address may be aligned over the door of the building when a user views it through an AR browser.

Some AR games demonstrate the excitement that social aspects of AR may offer, but the AR characters are presented imprecisely, not allowing two players to see the same AR character in the same way, or in the same precise spot. A modeled building (as in the example above) might allow the same alignment of AR characters, but that requires a location/scene to have been previously modelled. Thus, existing techniques will not work with unmodeled or dynamically changing scenes.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to dynamically sending local visual landmark information from multiple end user devices to a central server that is controlling the augmented reality (AR) experience. The local landmarks enable better alignment of the AR representations across devices. This allows multiple players to dynamically synchronize on shared landmarks that "anchor" the AR experience so that it is located in a precise place for multiple players. The landmarks may be dynamic, or transitory, and do not require pre-modelling of a location.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described herein may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
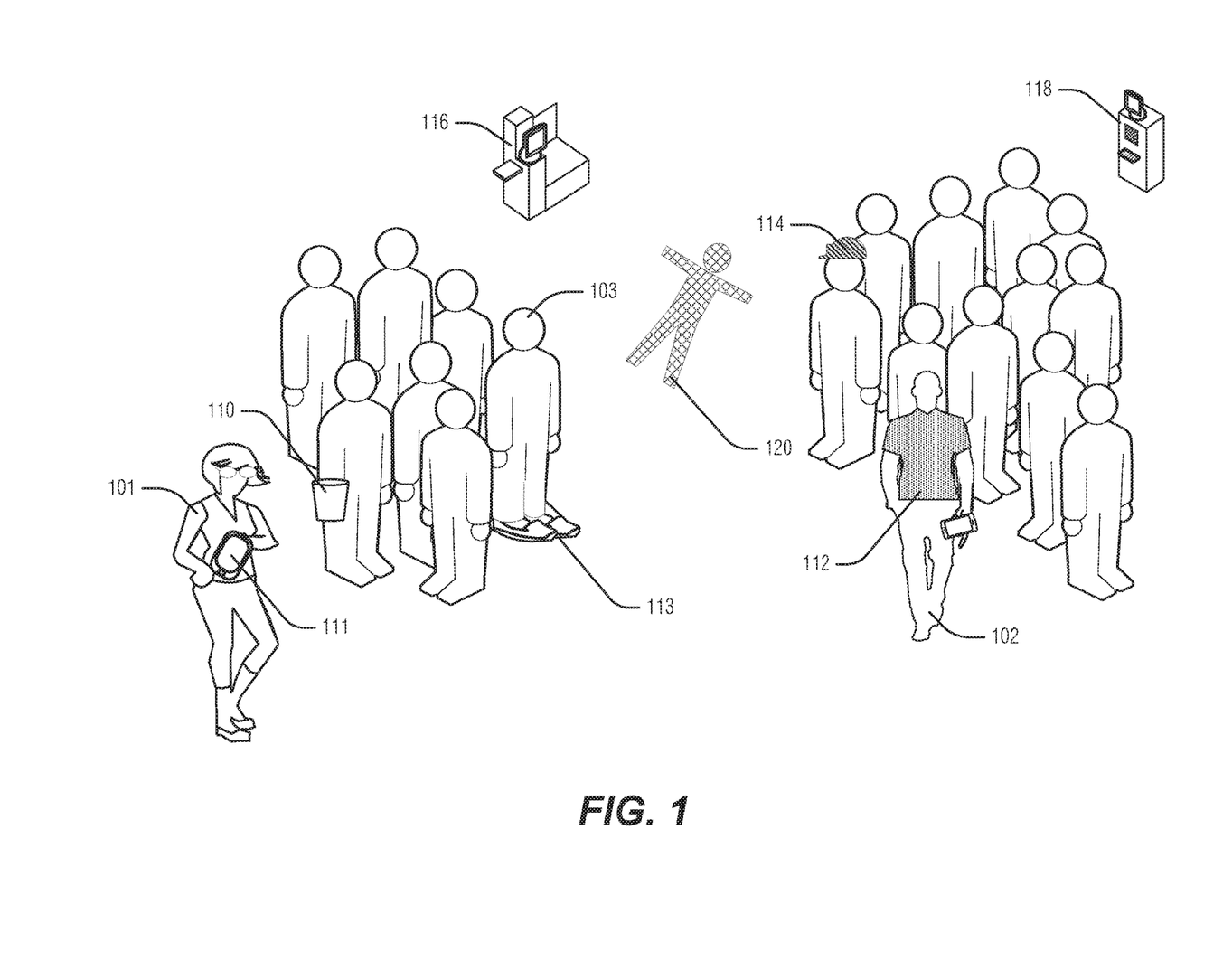
FIG. 1 is an illustration of an environment in which multiple players may be playing an AR game, according to an embodiment.

FIG. 1 is an illustration of an environment in which multiple players may be playing an AR game. It should be noted that while description of the AR system herein refers to a game, other AR applications (e.g., sightseeing application, AR art installation, AR film, etc.) may use the techniques described. The game may be any game using visual AR elements. In an example, player 101 and player 102 are able to see the same model of the AR character 120 in the same precise location and orientation. It should be noted that the term AR character, AR element, and AR object may be used interchangeably in the present disclosure. The term character is used because in many gaming and visualization systems a cartoon-like or caricature character, for instance for a personality or virtual self-determination, is sought. So, the term character may better illustrate embodiments. However, a user may be seeking a more generic augmented "element" or "object" and not specifically a cartoon-like character. A visual landmark, in this example, a hat 114 worn by a person may be selected by the system, and allows the system to anchor the AR character 120 in space the same way for both players 101, 102. In an embodiment, the players' devices may send a stream of images to a server to allow the system to continuously determine landmarks. For instance, player 101 holds a mobile device 111, such as a smartphone with a camera. Other primary or secondary landmarks may be selected such as a bright, or easily identifiable cup 110 held by a person in the environment, or brightly colored shoes 113 worn by a player 103, or a shirt 112 with a distinctive pattern or logo. Stationary objects 116, 118 in the environment may also be selected as landmarks. In an embodiment, all players may not be able to see a primary landmark, so a secondary landmark may be selected and used simultaneously, in the system. In some embodiments an AR landmark may not be visible to a person. For example, the system may determine a landmark through infrared sensing.

Existing AR systems typically use AR SDKs (software development kits) for developing AR elements for the real world. There has been some work done to identify visual landmarks in certain localities. When an end user frames the landmark using a camera in their mobile device, the AR system may match the landmark, for instance, a building, with the building landmark that has been stored in its database. Once the landmark has been matched, the system may display information about that landmark or locality on the user's device. However, there are inherent problems with this approach. For instance, there are areas that have not been mapped and identified objects stored into the database for landmarks. Also, things in the real world tend to change over time. Thus, it becomes more and more difficult to match the landmark that is in the database with a real world image of the landmark.

Existing system may first identify the location of the user, for instance, using satellite navigation systems (e.g., Global Positioning System (GPS)) location facilities. The images from the user device may then be matched to images relevant to the location, to reduce the search. The pattern matching algorithms may be resident on a cloud server, and not on the user device. However, the user's view of the landmark may be blocked, for instance, when a large truck is parked outside the building and blocking enough of the view for the matching algorithms to fail.

Figure 2:
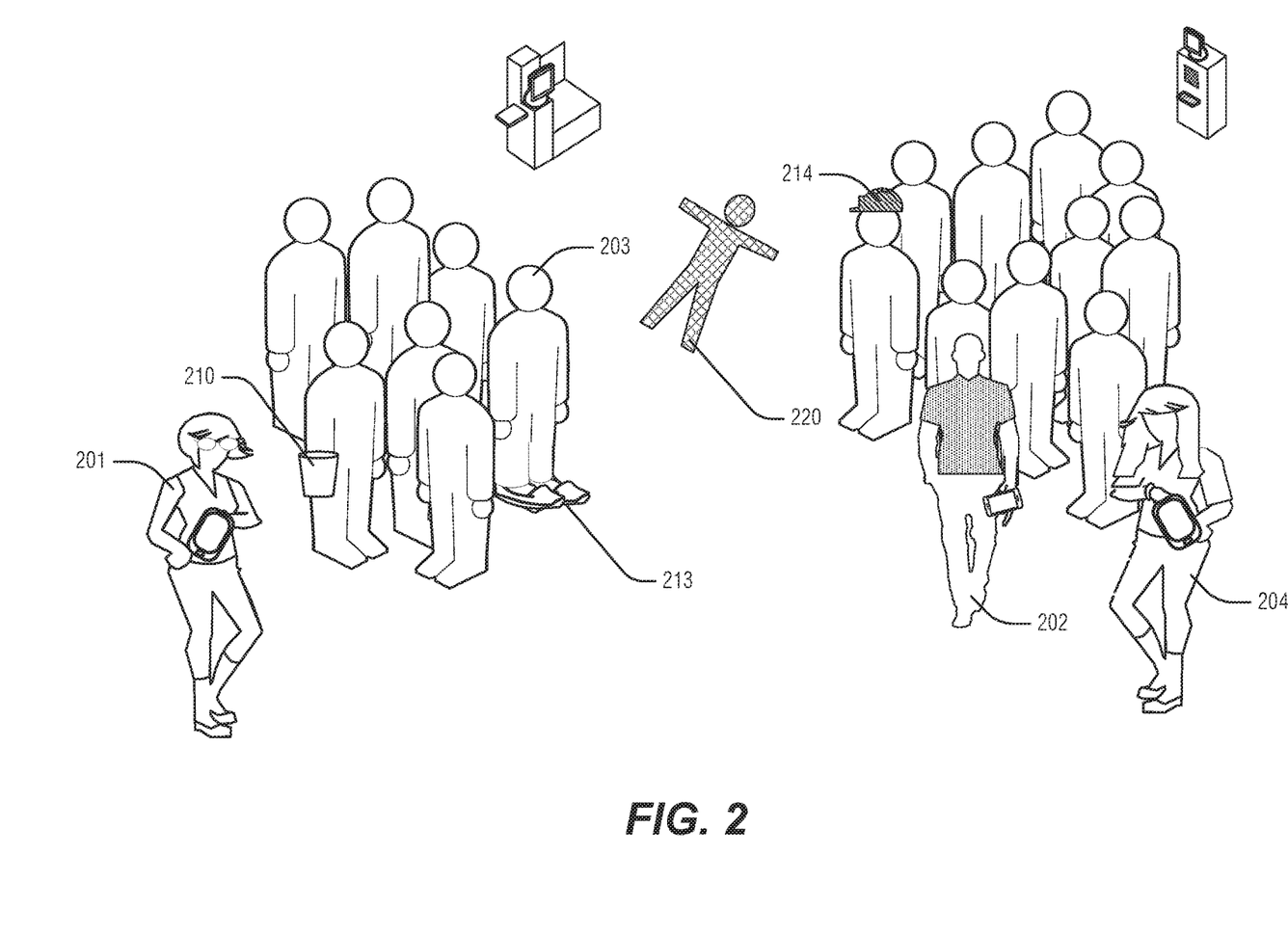
FIG. 2 illustrates the environment of FIG. 1, where a third player has entered the scene.

Referring to FIG. 2, there is shown the same environment as in FIG. 1, where a third player 204 has entered the scene. In an example, player 201 and player 202 have a common landmark cup 210 to place them in a relative position to the AR character 220. In an embodiment, dynamic landmarks are generated, so that users entering the AR experience for the current location still have access to one or more landmarks to anchor images and AR elements. In this example, the dynamic landmark was created for cup 210, but new player 204 cannot see cup 210. Player 202 is in the line of sight between user 204 and the cup 210. So, in this case, player 204 uses a secondary landmark. In this example, a new landmark may be selected as the brightly colored hat 214 that person 103 is wearing. All of players 201, 202, and 204 are able to see hat 214. Thus, hat 214 may be selected for the secondary landmark. In another example, the shoes 213 worn by player 203 are also able to be seen by players 201, 202, and 204. Thus, shoes 213 may be selected as a secondary landmark, instead.

In an embodiment, a primary landmark may be seen by players 201 and 202, but not player 204. Players 202 and 204 may be able to see a secondary landmark, but player 201 cannot see the secondary landmark. In this embodiment, the AR character is anchored to both the primary and secondary landmark simultaneously.

During the landmark selection process, a cloud service associated with the AR application compares images captured by all of the current users 201, 202, 203 and 204. The images are compared to identify common features, elements or landmarks.

In an embodiment, a three-dimensional (3D) scene of the environment is captured by one or more depth cameras, or modeled using multiple 2D cameras. The 3D representation may be used to rotate the AR character for each player, so that the player sees the AR character in a position relative to how it is seen by others. A 3D model may also make finding dynamic landmarks easier, as they may be envisioned from several different perspectives, and identified as a single landmark. For instance, when a 3D scene of the environment is available, the image model may be rotated for each user based on the user's orientation in environment, so that the image used for comparison is seen from the perspective of the user. Thus, images captured by the user are more easily compared to the rotated 3D image.

Figure 3A:
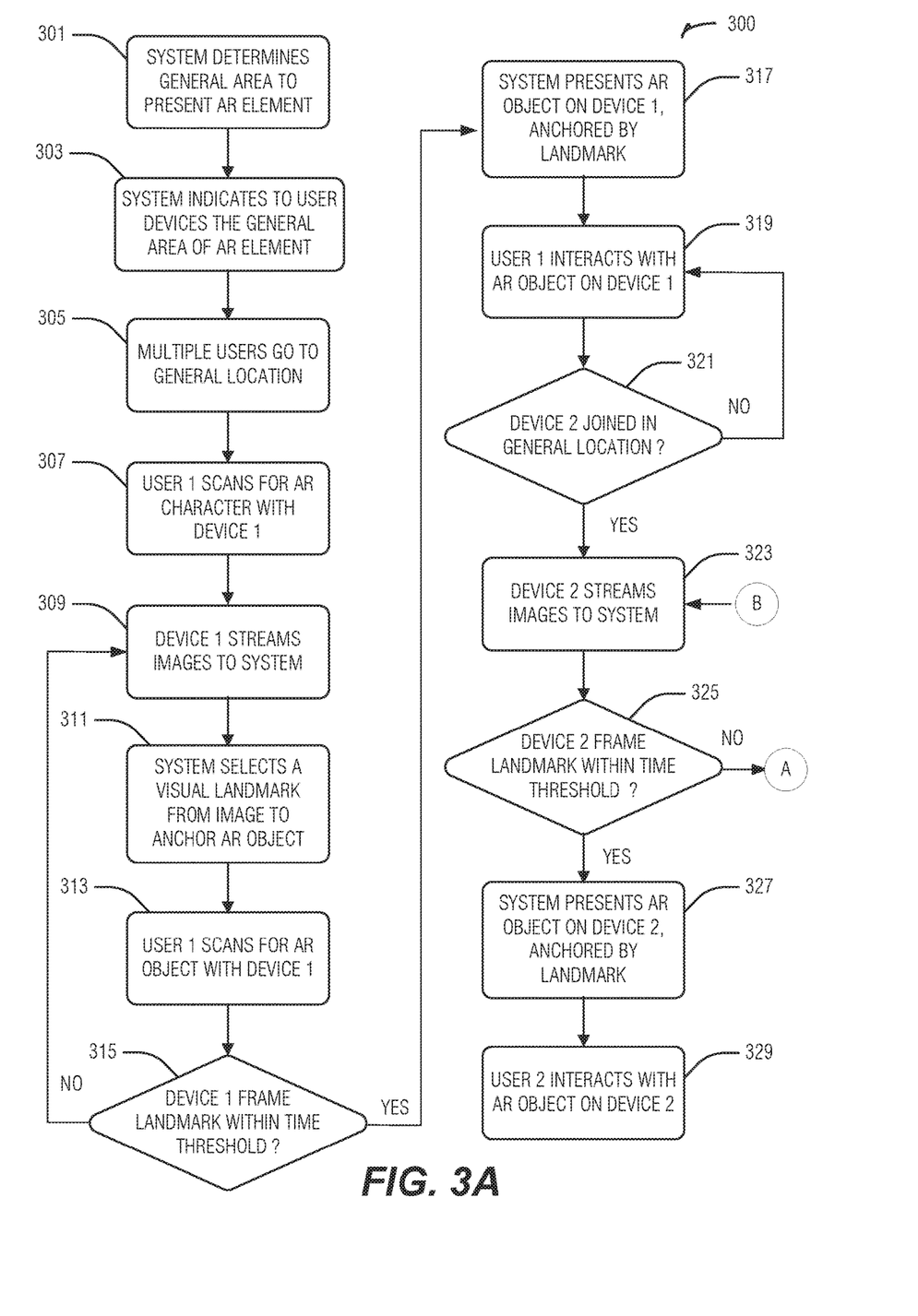
FIGS. 3A and 3B are a flow chart representing a method for generating and using dynamic landmarks, according to an embodiment.
Figure 3B:
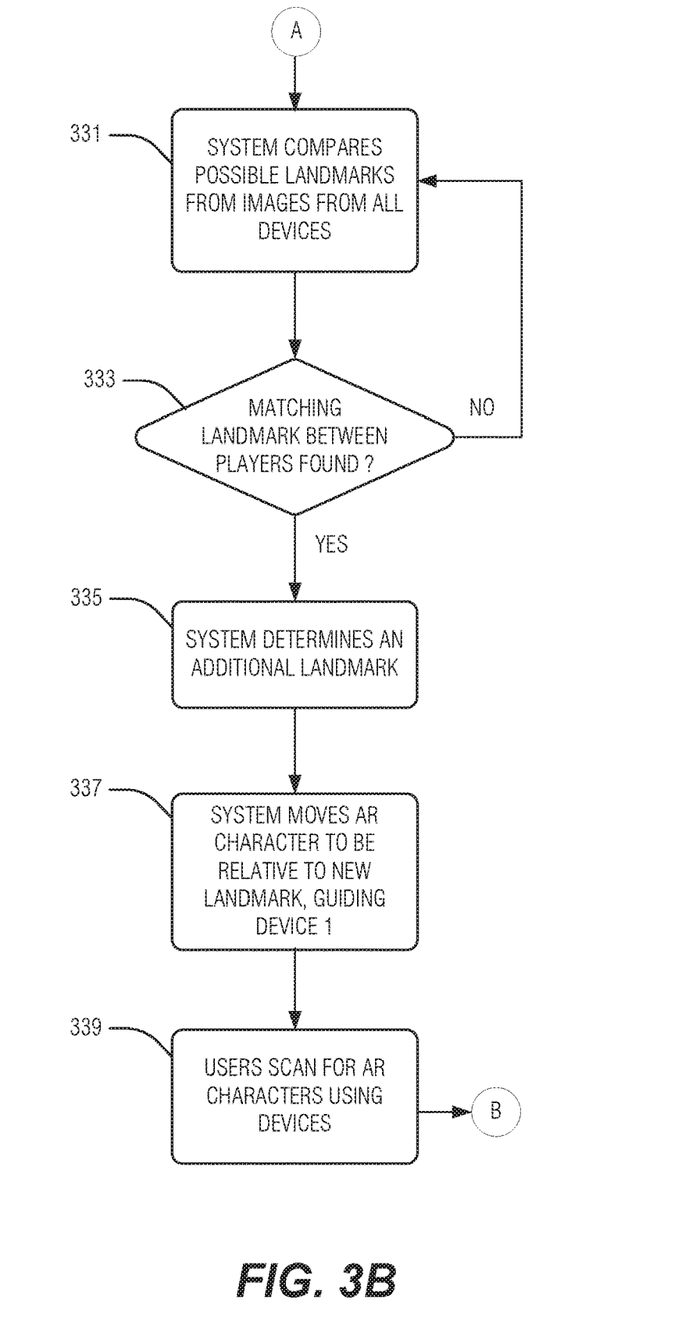

FIGS. 3A and 3B are a flow chart representing a method for generating and using dynamic landmarks, according to an embodiment. First, the AR system determines the general area to present the AR element (i.e., AR object or character), in block 301. This general area may be determined by GPS location services or devices. The AR system then indicates to user devices the general area of the AR element, in block 303. In a gaming example, multiple users may go to the general location of the AR element, in block 305. A first user may scan the area for AR elements (e.g., characters) with their device, in block 307. The device may be a tablet or smart phone or other mobile device or wearable with a camera. For instance, the user will have the AR application running on their device and then pan the device around the environment, so that various parts of the environment are captured by the camera. Those images are sent to the AR system for comparison and to find a landmark, in block 309. In an example, objects are selected and a landmark is selected based on easy identification of that object. So, brightly colored objects, unusually colored, objects, unusually shaped objects, or easily identifiable objects, may be used initially to provide a primary landmark. In the example above, a hat or shoes or other object found on a person was used to create a landmark. However, if those objects move too quickly, the AR system may find a secondary landmark that is more stationary, or more fixed in the environment. In other words, stationary or mostly stationary objects may be deemed to be more permanent, or fixed, in the environment. Some object may be permanently fixed, temporarily fixed, or mobile (e.g., not fixed at all), or anywhere in between, with respect to the environment. The AR system selects a visual landmark from images to anchor the AR element within an image.

There are several techniques that may be used for landmark determination. A number of possibilities are cited in the paper, by Taketomi, T., Sato, T., Yokoya, N., entitled *Real-time camera position and posture estimation using a feature landmark database with priorities*. [Pub: In: CD-ROM Proc. 19th IAPR Int. Conf. on Pattern Recognition (2008)] (hereafter, "Taketomi"). Taketomi describes in part [internal citations omitted]:

"One is visual SLAM based method that can estimate camera parameters without a pre-knowledge of target environment. In this method, database construction and camera parameter estimation are carried out simultaneously. However, absolute camera position and posture cannot be acquired. The other uses some kinds of pre-constructed databases such as 3-D models and feature landmarks. In this approach, absolute camera position and posture estimation can be realized. However, construction of 3-D models for large and complex outdoor environments needs large human costs."

The term anchoring may be more precisely referred to as alignment and orientation. One method for anchoring is a combination of computer vision and inertial sensing. Vision may be used to match the image (of an object) of interest, and once the match is made, the system presents the AR content in the prescribed position, relative the image. The positioning may be application-specific. For instance, a game application may prescribe a position below the image. Using inertial sensing, small adjustments may be made to the alignment of the AR content with relatively low computation, followed by periodic adjustments using vision again. Moreover, vision may be used by itself with enough computation.

In an embodiment, the AR system selects a visual landmark from the image with which to anchor an AR object, in block 311. The user scans for the AR object with device one, for instance, by panning the smart phone or camera around the room, in block 313. A determination is made as to whether device one has framed an identified landmark within a specific time threshold, in block 315. For instance, a pre-selected threshold might be 10, seconds 60 seconds, or longer. A time threshold may be used to account for landmarks that are moving. For instance, the primary landmark may be the shoes 213 as shown in FIG. 2. However, shoes 213 are being worn by user 203. If user 203 leaves the environment or the scene then that landmark will no longer be able to be found by any user. Thus, a limited time is provided for the user to acquire the landmark with their camera.

If the frame of the landmark is not found within the threshold of time, then the user will continue to stream images to the AR system, in block 309, and then iterate again by trying to select a visual landmark while scanning for the AR object with the device (blocks 311-315). Once the landmark has been framed within the time threshold, as determined in block 315, then the AR system presents the AR object on the user device, anchored by the landmark, in block 317. The user may then interact with the AR object on their device according to the rules of their game, or their utility application that provides the AR, in block 319.

When a second user enters the environment, as indicated in block 321, the second user's device streams their images to the AR system in block 323. The second user iterates through the process in a similar fashion as the first user. When the second device has framed the landmark within a time threshold as indicated in block 325, then the system presents the AR object on the second user's device, anchored by the landmark, in block 327. The user may then interact with the AR object as prescribed by the application, in block 329.

If the second user is unable to frame the landmark within the time threshold, as indicated in block 325, then the AR system compares possible landmarks from images from all devices operating in the environment, in block 331. If there are no matching landmarks between and among the players, as determined in block 333, then the AR system will continue to compare possible landmarks from images until it finds a viable landmark object. If an acceptable matching landmark is been found, then the system determines an additional landmark for users, in block 335. When the additional, or secondary, landmark has been selected and identified, the AR system may move the AR object to be relative to the new landmark in the user's display, and guides the first device to new location or representation, in block 337. All active users may then continue to scan for the AR characters using their devices, in block 339. The process continues with the second user's device streaming images to the AR system, in block 323. In an embodiment, the first and other users will also continue to stream their images to the AR system, as they continue navigating around the environment. Thus, there will be more images to compare for identifying dynamic landmarks as each user streams more and more images of the environment. The process above for the second user may be repeated for additional users entering the environment, and looking for the AR objects.

In an embodiment, some, though not necessarily all, users share at least one visual landmark. In other words, two or more users may share one or more landmarks. A group of people may share several visual landmarks that shift throughout a session and the landmarks may depend on the visual angle and visual obstructions of each user. Any given landmark may be difficult to locate for some users. Those users may have to look around and visually scan for some time to find landmarks that are easier for some other users to see. Visual landmarks may come and go during a sessions, which may require landmark replacements. In other examples, even if a landmark has exited the scene, if it was being used by a user that has also left the scene or environment, then there is no need to replace that landmark with another. Virtual, or AR characters may move during a session, requiring new landmarks to be established. An AR character may follow a landmark. And if that landmark exits the scene, for instance, because it being worn by an person exiting the scene, the AR character may follow the landmark out. The AR system may recognize landmarks, for instance, using existing object recognition technologies, in order to pick the best objects. The AR system may use the previously most useful objects, for instance, object types from a previously used location. An AR character may be anchored by a landmark that is not in frame on the device at a given moment in time. After finding the landmark, the system may help the user with some indicator to show in what direction to look for the AR character. The system may manipulate the behavior of AR characters to influence players to scan more area for possible new landmarks that are in common between players. Higher resolution cameras, high bandwidth networks, and edge servers may all allow more subtle landmarks to be used.

In an example, the landmark may be linked to a fully identified object such as a person's bright red hat. In another example, the landmark may be linked to a red blob having dimensions approximate 10 inches wide by 6 inches high, and last seen at specific coordinates at a height of 5'8". For objects that have easily identifiable characteristics, it may not be necessary to fully define, or delineate, the object in order to assign it as a landmark and visually track the landmark.

Figure 4:
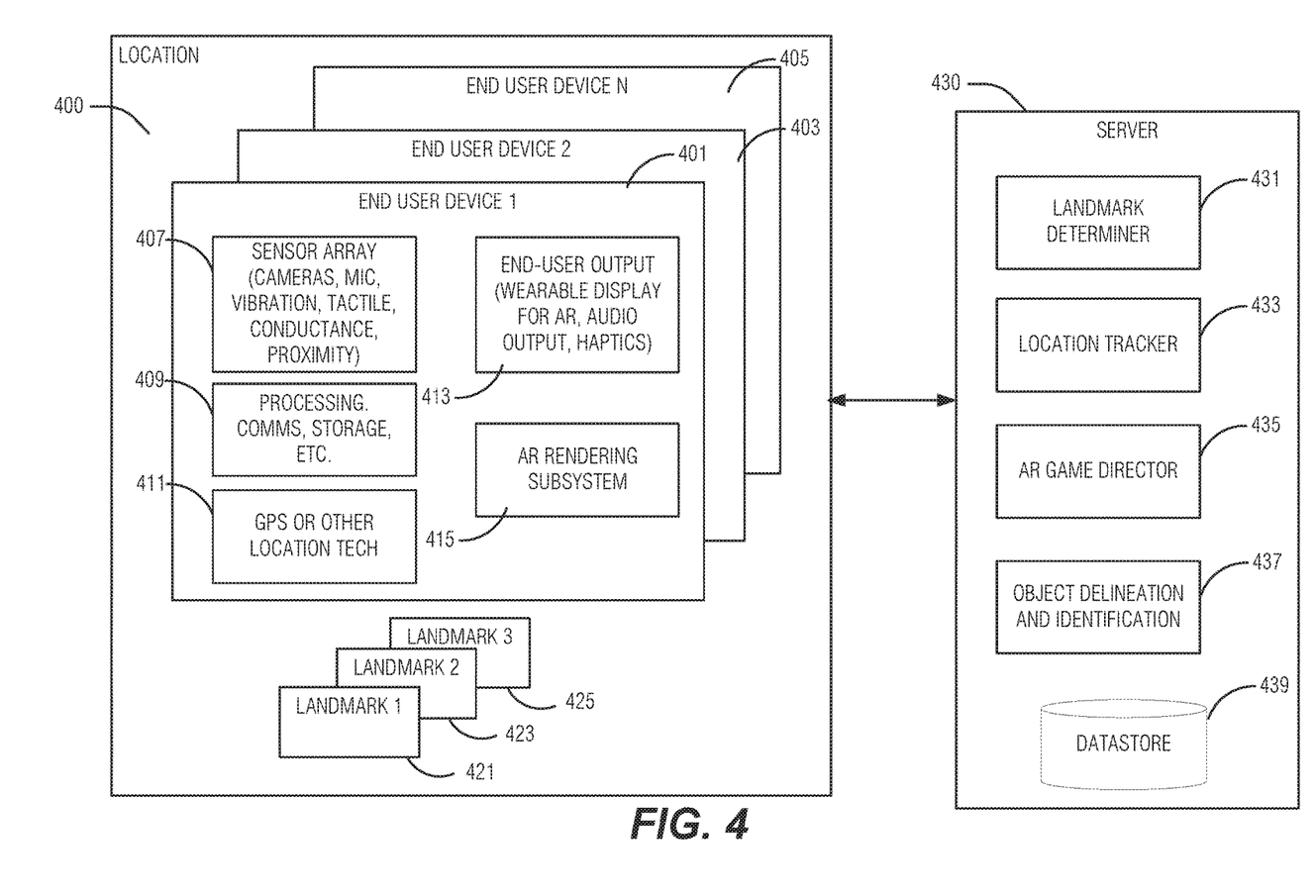
FIG. 4 is a block diagram illustrating the interaction of components of an AR system on a server with players' devices in an environment, according to an embodiment.

An embodiment utilizes a number of subsystems, modules, components or logic for identifying landmarks, anchoring AR objects to the landmarks, and enabling users to track and identify the AR objects in an environment. FIG. 4 is a block diagram illustrating the interaction of an AR system, residing on a server 430, with user devices 401, 403 and 405, in an environment 400, according to an embodiment. User devices 401, 403, 405, may be wearable devices, smartphones, heads up displays, or any other type of mobile computing device that may be kept with a person moving throughout the environment. The wearable or other computing device may be equipped with sensor array 407; a processing unit with communication capability, storage, etc. 409; GPS or other location tracker 411; output or display subsystem 413; and AR rendering subsystem 415. The sensor array 407 may include a camera, microphone, accelerometer (e.g., to sense vibration, orientation, etc.), tactile or haptic devices (e.g., a vibration motor), conductance circuitry, proximity sensors, etc. Cameras may be singular or in an array of 3D 2D, or depth cameras, RGB or infrared. The AR system on server 430 may include object identification logic 437; an AR game director 435 to direct the game or application progress; landmark determiner logic 431 to receive image frames from end user devices and identify landmarks using machine vision technology; and a location tracking system 433 to be used with information received from the GPS, SLAM (simultaneous localization and mapping), or other location tracking technology 411 on the end user devices 401, 403, 405. The server 430 may be cloud-based, but in alternative embodiments may be an edge server or run on one of the user devices. In an embodiment, the AR game director 435 receives and manages the images and stores them in datastore 439. Components needing access to the images may either retrieve them directly from the datastore 439, or from the AR Game director 435, responsive to a request for the image.

Landmark determiner 431 select landmarks based on characteristics of a brightly colored object, oddly shaped object, objects with infrequently seen colors, objects that may be assumed to be relatively stationary, etc. The landmark determiner 431 may use objects identified in datastore (database) 439 that have been delineated as objects in the environment with quantifiable and qualitative measures, as determined by the object delineation and identification logic 437. The landmark determiner 431 may keep a historical record of landmarks used for specific environments in datastore 439 along with a classification such as identifying the landmark as being fleeting (e.g., moving quickly, above a threshold relative velocity), stationary (e.g., not moving), easily recognizable, etc. Objects that were used with success in the past, for instance, those being visible and trackable by most users, may be the first objects assigned landmark status. Context of an object may be used to determine a qualitative value. For instance, in many cases, a truck might be seen as likely to exit the environment quickly. But if the truck is parked, or visibly being unloaded or loaded with items, it may be viewed as temporarily stationary and a good choice for a landmark, as it may be seen from many angles and distances. In example environment 400, landmarks 421, 423, and 425 have been identified. Objects that have not been used as a landmark for a predetermined amount of time, may be expired and removed from the database as being stale.

Qualitative values for objects may be determined in the object delineation and identification logic 437, and may be application dependent. This logic 437 may analyze the incoming images of the environment from the various users and use an object database 439 to identify specific object or object types. An object type may have a parameter associated with it to indicate likelihood of the object being stationary or moving. Each object type may further have a measure of usefulness of that type of object. For instance, shoes may not be a high priority to make a landmark. Shoes often walk away with their owner. A stop sign, speed limit sign, or street sign may have a high qualitative measure for being stationary and therefore may make a good landmark. However, in some applications, an AR character may be anchored to a moving object. For instance the AR character might have hopped up onto the roof of a car and be moving away with that car. In this case, a user would need to be in their own vehicle in order to follow that particular AR character. In an embodiment, an object may not be fully delineated, as described above. In order to assign an object to a landmark, the object just needs to be identifiable, and may be a portion of an image or portion of an object.

In an embodiment, components 431, 433, 435, 437 and datastore 439 may reside on different servers or compute nodes, and communicate as in a distributed architecture. It will be understood that different combinations of the components may reside on the same compute node or different compute node in any combination.

Figure 5:
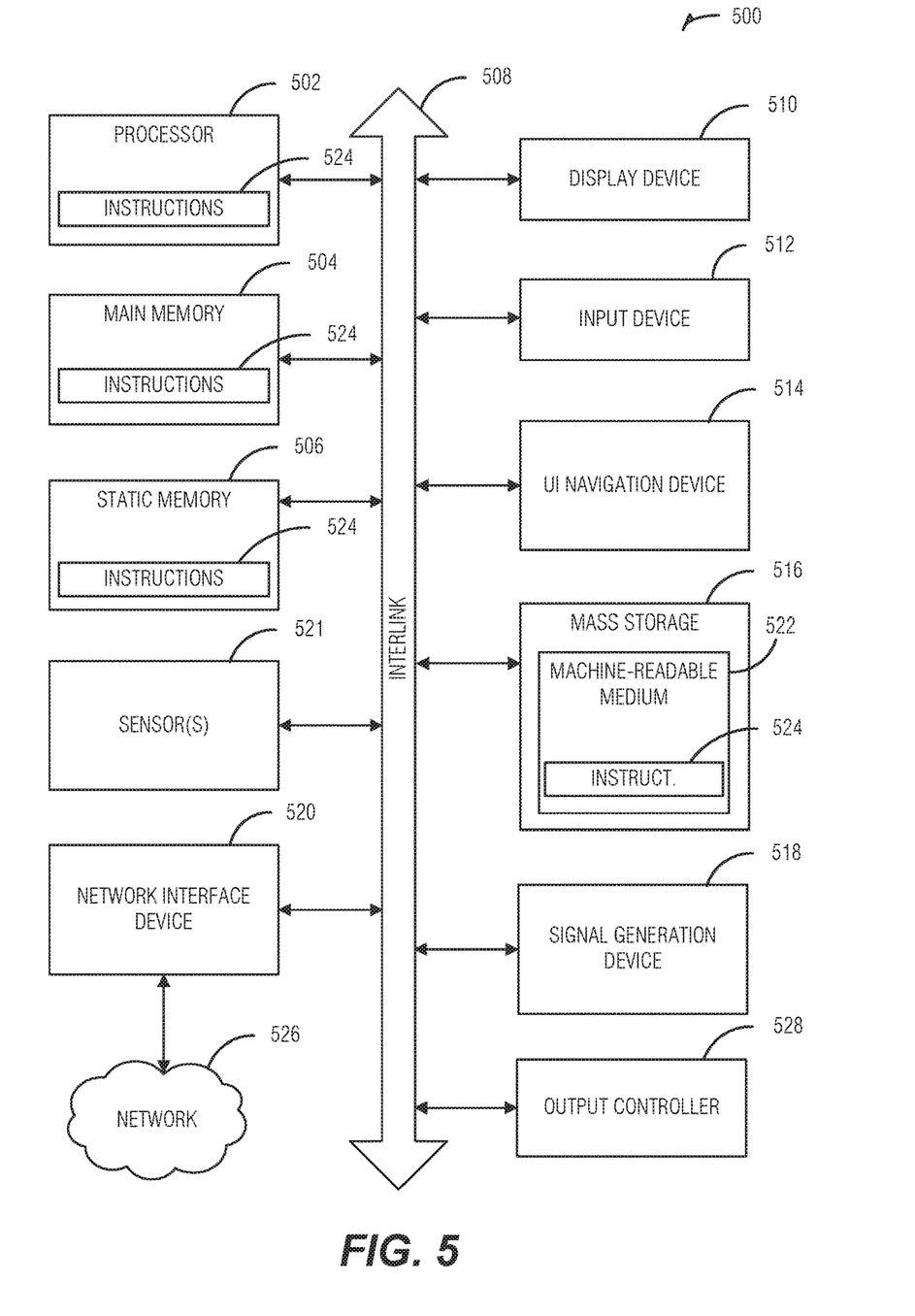
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES AND EXAMPLES

Examples may include subject matter such as a system, device, method, means for performing acts of the method, at least one machine-readable medium including instructions that, when performed by a machine cause the machine to performs acts of the method, or of an apparatus or system for assigning landmarks in an environment and anchoring an augmented reality object to the landmark for use in an augmented reality system with multiple users, according to embodiments and examples described herein.

Example 1 is a system for using dynamic landmarks in an augmented reality system, comprising: an augmented reality application director to manage the augmented reality system and to anchor an augmented reality object to a selected landmark; a landmark determiner to select the landmark from an image corresponding to an environment, the selected landmark corresponding to a portion of the image, the image portion to be stored in a database as the selected landmark, wherein the selected landmark is deemed to be visible to a user providing the image, based on the presence of the portion of the image in the image, wherein the selected landmark is deemed to be visible to a second user providing a second image, based on the presence of the portion of the image in the second image; and an augmented reality rendering subsystem to present the augmented reality object with the selected landmark for display.

In Example 2, the subject matter of Example 1 optionally includes wherein the portion of the image is selected based on ability to delineate at least a color or a shape capable of being tracked in successive images of the environment.

In Example 3, the subject matter of any one or more of Examples 1-2 optionally include a location tracker to track movements of the user relative to the selected landmark.

In Example 4, the subject matter of Example 3 optionally includes wherein the location tracker is further to track movements of the augmented reality object to the user.

In Example 5, the subject matter of any one or more of Examples 1-4 optionally include wherein the image portion includes an identifiable object, and wherein the selection of the landmark corresponding to the portion of the image is based at least in part on a determination of relative permanence of the identifiable object.

In Example 6, the subject matter of any one or more of Examples 1-5 optionally include an object delineation and identification component communicatively coupled to an object database, when in operation, the object delineation and identification component to receive the image corresponding to an environment, and to identify an object in the environment corresponding to the portion of the image, the object having quantifiable and qualitative measures, and to store information corresponding to the object in the database.

In Example 7, the subject matter of any one or more of Examples 1-6 optionally include wherein the landmark determiner is to select a second landmark when the selected landmark is not visible to the second user, as determined by a subsequent image received from the second user.

In Example 8, the subject matter of Example 7 optionally includes wherein the second landmark is to be selected based on visibility of the portion of the image to both the user and the second user.

In Example 9, the subject matter of any one or more of Examples 1-8 optionally include wherein the augmented reality application director is to send anchoring information to the user, wherein the anchoring information includes identification of the landmark, and a position of the augmented reality object relative to the landmark and a position of the augmented reality object relative the user device, as derived from the image.

Example 10 is a computer implemented method for using dynamic landmarks in an augmented reality system, comprising: receiving an image corresponding to an environment, from a user device; identifying an object in the image; assigning the object as a landmark in the environment; anchoring an augmented reality object to the landmark; and sending anchoring information, to the user device, the anchoring information including identification of the landmark, and a position of the augmented reality object relative to the landmark and the user device; receiving a second image corresponding to the environment, from a second device; determining whether the landmark is present in the second image; when the landmark is present in the second image, sending anchoring information to the second device, wherein the anchoring information includes identification of the landmark, and a position of the augmented reality object relative to the landmark and the second device; and when the landmark is not present in the second image, assigning a second landmark associated with a second object in the environment, wherein the second object is present in both the image and the second image, anchoring the augmented reality object to the second landmark, and sending the anchoring information to the second device, wherein the anchoring information includes identification of the second landmark, and a position of the augmented reality object relative to the second landmark and the second device.

In Example 11, the subject matter of Example 10 optionally includes receiving a subsequent image corresponding to the environment, from a subsequent device; determining whether the landmark is present in the subsequent image; when the landmark is present in the subsequent image, sending anchoring information to the subsequent device, wherein the anchoring information includes identification of the landmark, and a position of the augmented reality object relative to the landmark and the subsequent device; and when the landmark is not present in the subsequent image, assigning a subsequent landmark associated with a subsequent object in the environment, wherein the subsequent object is present in both the subsequent image and at least one of the image and the second image, anchoring the augmented reality object to the subsequent landmark, and sending the anchoring information to the subsequent device, wherein the anchoring information includes identification of the subsequent landmark, and a position of the augmented reality object relative to the subsequent landmark and the subsequent device.

In Example 12, the subject matter of any one or more of Examples 10-11 optionally include presenting the augmented reality object with the landmark for display.

In Example 13, the subject matter of Example 12 optionally includes tracking movements of the user device relative to the landmark; and providing an indicator to the user device identifying a direction for a next image to be captured, the next image to be used in determining whether the landmark is present in the next image.

In Example 14, the subject matter of any one or more of Examples 10-13 optionally include wherein identifying an object in the image is based on ability to delineate in the object at least a color or a shape capable of being tracked in successive images of the environment.

In Example 15, the subject matter of any one or more of Examples 10-14 optionally include wherein assigning the object as a landmark in the environment is based at least in part on a determination of relative permanence of the object within the environment.

Example 16 is at least one computer readable storage medium having instructions stored therein, the instructions when executed on a machine, cause the machine to: retrieve an image corresponding to an environment, the image corresponding to a perspective of a user device; identify an object in the image; assign the object as a landmark in the environment; anchor an augmented reality object to the landmark; send anchoring information, to the user device, the anchoring information including identification of the landmark, and a position of the augmented reality object relative to the landmark and the user device; retrieve a second image corresponding to the environment, the second image corresponding to a perspective of a second device; determine whether the landmark is present in the second image; when the landmark is present in the second image, send anchoring information to the second device, wherein the anchoring information includes identification of the landmark, and a position of the augmented reality object relative to the landmark and the second device; and when the landmark is not present in the second image, assign a second landmark associated with a second object in the environment, wherein the second object is present in both the image and the second image, anchor the augmented reality object to the second landmark, and send the anchoring information to the second device, wherein the anchoring information includes identification of the second landmark, and a position of the augmented reality object relative to the second landmark and the second device.

In Example 17, the subject matter of Example 16 optionally includes instructions to: retrieve a subsequent image corresponding to the environment, the subsequent image corresponding to a perspective of a subsequent device; determine whether the landmark is present in the subsequent image; when the landmark is present in the subsequent image, send anchoring information to the subsequent device, wherein the anchoring information includes identification of the landmark, and a position of the augmented reality object relative to the landmark and the subsequent device; and when the landmark is not present in the subsequent image, assign a subsequent landmark associated with a subsequent object in the environment, wherein the subsequent object is present in both the subsequent image and at least one of the image and the second image, anchor the augmented reality object to the subsequent landmark, and send the anchoring information to the subsequent device, wherein the anchoring information includes identification of the subsequent landmark, and a position of the augmented reality object relative to the subsequent landmark and the subsequent device.

In Example 18, the subject matter of any one or more of Examples 16-17 optionally include instructions to: present the augmented reality object with the landmark for display.

In Example 19, the subject matter of Example 18 optionally includes instructions to: track movements of the user device relative to the landmark; and provide an indicator to the user device identifying a direction for a next image to be captured, the next image to be used in determining whether the landmark is present in the next image.

In Example 20, the subject matter of any one or more of Examples 16-19 optionally include wherein identifying an object in the image is based on ability to delineate in the object at least a color or a shape capable of being tracked in successive images of the environment.

In Example 21, the subject matter of any one or more of Examples 16-20 optionally include wherein assigning the object as a landmark in the environment is based at least in part on a determination of relative permanence of the object within the environment.

Example 22 is at least one computer readable storage medium having instructions stored therein, the instructions when executed on a machine, cause the machine to: compare a first image corresponding to an environment, from a first user device, to a second image corresponding to the environment, from a second user device; identify an image portion common to the first image and the second image; assign the image portion as a landmark in the environment; anchor an augmented reality object to the landmark; and send anchoring information, to the first and second user devices, the anchoring information including selection of the landmark, and a position of the augmented reality object relative to the landmark.

In Example 23, the subject matter of Example 22 optionally includes instructions to: present the augmented reality object with the landmark for display.

In Example 24, the subject matter of Example 23 optionally includes instructions to: track movements of the user device relative to the landmark; and provide an indicator to the user device identifying a direction for a next image to be captured, the next image to be used in determining whether the landmark is present in the next image.

Example 25 is at least one computer readable storage medium having instructions stored therein, the instructions when executed on a machine, cause the machine to perform the method of any of Examples 10-15.

Example 26 is a system for using dynamic landmarks in an augmented reality system, comprising means to perform the method of any of Examples 10-15.

Example 27 is a system for using dynamic landmarks in an augmented reality system, comprising: an augmented reality application director to manage the augmented reality system and to anchor an augmented reality object to a selected landmark; a landmark determiner to select the landmark from an image corresponding to an environment, the selected landmark corresponding to a portion of the image, the image portion to be stored in a database as the selected landmark, wherein the selected landmark is deemed to be visible to a user providing the image, based on the presence of the portion of the image in the image, wherein the selected landmark is determined to be visible or not visible to a second user providing a second image, based on the presence of the portion of the image in the second image, and when the selected landmark is not visible to the second user, then to select a second landmark corresponding to a second portion of the image, wherein the second portion of the image is present in both the first and second images; and an augmented reality rendering subsystem to present the augmented reality object with the selected landmark for display.

In Example 28, the subject matter of Example 27 optionally includes wherein the landmark determiner is to select a subsequent landmark when a selected landmark and second selected landmark are no longer visible by at least one of the first and second user, wherein the selected and second selected landmarks, and the subsequent landmark are saved in the database for possible selection as a selected landmark at a later time.

In Example 29, the subject matter of any one or more of Examples 27-28 optionally include a location tracker to track movements of the user relative to the selected landmark, and to provide an indicator to the user to identify a direction for a next image to be captured, the next image to be used in determining whether the landmark is present in the next image.

Example 30 is a system for using dynamic landmarks in an augmented reality system, comprising: means for receiving an image corresponding to an environment, from a user device; means for identifying an object in the image; means for assigning the object as a landmark in the environment; means for anchoring an augmented reality object to the landmark; and means for sending anchoring information, to the user device, the anchoring information including identification of the landmark, and a position of the augmented reality object relative to the landmark and the user device; means for receiving a second image corresponding to the environment, from a second device; means for determining whether the landmark is present in the second image; means for sending anchoring information to the second device, when the landmark is present in the second image, wherein the anchoring information includes identification of the landmark, and a position of the augmented reality object relative to the landmark and the second device; and means for assigning a second landmark associated with a second object in the environment, when the landmark is not present in the second image, wherein the second object is present in both the image and the second image, anchoring the augmented reality object to the second landmark, and sending the anchoring information to the second device, wherein the anchoring information includes identification of the second landmark, and a position of the augmented reality object relative to the second landmark and the second device.

In Example 31, the subject matter of Example 30 optionally includes means for receiving a subsequent image corresponding to the environment, from a subsequent device; means for determining whether the landmark is present in the subsequent image; means for sending anchoring information to the subsequent device, when the landmark is present in the subsequent image, wherein the anchoring information includes identification of the landmark, and a position of the augmented reality object relative to the landmark and the subsequent device; and means for assigning a subsequent landmark associated with a subsequent object in the environment, when the landmark is not present in the subsequent image, wherein the subsequent object is present in both the subsequent image and at least one of the image and the second image, anchoring the augmented reality object to the subsequent landmark, and sending the anchoring information to the subsequent device, wherein the anchoring information includes identification of the subsequent landmark, and a position of the augmented reality object relative to the subsequent landmark and the subsequent device.

In Example 32, the subject matter of any one or more of Examples 30-31 optionally include means for presenting the augmented reality object with the landmark for display.

In Example 33, the subject matter of Example 32 optionally includes means for tracking movements of the user device relative to the landmark; and means for providing an indicator to the user device identifying a direction for a next image to be captured, the next image to be used in determining whether the landmark is present in the next image.

In Example 34, the subject matter of any one or more of Examples 30-33 optionally include wherein means for identifying an object in the image is based on ability to delineate in the object at least a color or a shape capable of being tracked in successive images of the environment.

In Example 35, the subject matter of any one or more of Examples 30-34 optionally include wherein means for assigning the object as a landmark in the environment is based at least in part on a determination of relative permanence of the object within the environment.

Example 36 is a system configured to perform operations of any one or more of Examples 1-35.

Example 37 is a method for performing operations of any one or more of Examples 1-35.

Example 38 is a at least one machine readable storage medium including instructions that, when executed by a machine cause the machine to perform the operations of any one or more of Examples 1-35.

Example 39 is a system comprising means for performing the operations of any one or more of Examples 1-35.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. To simplify the description herein, the terms logic, modules, components and subsystem may be used interchangeably. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system for using dynamic landmarks in an augmented reality system, comprising:
    a memory; and
    an electronic processor to:
        identify an object in a first image, the first image from a user device and corresponding to an environment;
        assign the object as a first landmark in the environment;
        anchor an augmented reality object to the first landmark;
        send first anchoring information to the user device, the first anchoring information including identification of the first landmark and a position of the augmented reality object relative to the first landmark and the user device;
        store the first anchoring information in the memory;
        determine whether the first landmark is present in a second image, the second image from a second device and corresponding to the environment;
        assign a second landmark associated with a second object in the environment based on the first landmark not being present in the second image, wherein the second object is present in both the first image and the second image;
        anchor the augmented reality object to the second landmark;
        send second anchoring information to the second device, wherein the second anchoring information includes identification of the second landmark and a position of the augmented reality object relative to the second landmark and the second device; and
        send third anchoring information to the user device, wherein the third anchoring information includes identification of the second landmark and a position of the augmented reality object relative to the second landmark and the user device.

2. The system as recited in claim 1, wherein to identify the object in the first image the electronic processor selects the object based on ability to delineate at least a color or a shape capable of being tracked in successive images of the environment.

3. The system as recited in claim 1, further comprising a location tracker to track movements of the user relative to the first landmark.

4. The system as recited in claim 3, wherein the location tracker is further to track movements of the augmented reality object to the user device.

5. The system as recited in claim 1, wherein to identify the object in the first image the electronic processor selects the object based at least in part on a determination of relative permanence of the object.

6. The system as recited in claim 1, further comprising:
    an object delineation and identification component communicatively coupled to an object database, wherein the object delineation and identification component to:
    receive the first image corresponding to an environment;
    identify the object in the environment, the object having quantifiable and qualitative measures; and
    store information corresponding to the object in the database.

7. The system as recited in claim 1, wherein to identify the object in the first image the electronic processor is further configured to model a three-dimensional representation of the environment, wherein the three-dimensional model is used to identify the object.

8. The system as recited in claim 7, wherein the three-dimensional representation of the environment is modeled with multiple two-dimensional images.

9. The system as recited in claim 1, wherein the electronic processor is further to identify the object based on infrared sensing.

10. A computer implemented method for using dynamic landmarks in an augmented reality system, comprising:
    identifying an object in a first image, the first image from a user device and corresponding to an environment;
    assigning the object as a first landmark in the environment;
    anchoring an augmented reality object to the first landmark; and
    sending first anchoring information, to the user device, the first anchoring information including identification of the first landmark and a position of the augmented reality object relative to the first landmark and the user device;
    determining whether the first landmark is present in a second image, the second image from a second device and corresponding to the environment;

assigning a second landmark associated with a second object in the environment based on determining the first landmark is not present in the second image, wherein the second object is present in both the first image and the second image;

anchoring the augmented reality object to the second landmark;

sending second anchoring information to the second device, wherein the second anchoring information includes identification of the second landmark and a position of the augmented reality object relative to the second landmark and the second device; and sending third anchoring information to the user device, wherein the third anchoring information includes identification of the second landmark and a position of the augmented reality object relative to the second landmark and the user device.

11. The method as recited in claim 10, further comprising:
determining whether the second landmark is present in a subsequent image, the subsequent image from a subsequent device and corresponding to the environment; and sending third anchoring information to the subsequent device based on determining the second landmark is present in the subsequent image, wherein the third anchoring information includes identification of the second landmark and a position of the augmented reality object relative to the second landmark and the subsequent device.

12. The method as recited in claim 10, further comprising:
presenting the augmented reality object with the first landmark for display.

13. The method as recited in claim 12, further comprising:
tracking movements of the user device relative to the first landmark; and providing an indicator to the user device identifying a direction for a next image to be captured, the next image to be used in determining whether the first landmark is present in the next image.

14. The method as recited in claim 10, wherein identifying the object in the first image is based on ability to delineate in the object at least a color or a shape capable of being tracked in successive images of the environment.

15. The method as recited in claim 10, wherein assigning the object as the first landmark in the environment is based at least in part on a determination of relative permanence of the object within the environment.

16. The method as recited in claim 10, wherein identifying the object in the first image comprises modeling a three-dimensional representation of the environment, wherein the three-dimensional model is used to identify the object.

17. The model as recited in claim 16, wherein the three-dimensional representation of the environment is modeled with multiple two-dimensional images.

18. The method as recited in claim 10, further comprising identifying the object using infrared sensing.

19. At least one non-transitory computer-readable storage medium having instructions stored therein, the instructions when executed on a machine, cause the machine to:

identify an object in a first image, the first image from a user device and corresponding to an environment;

assign the object as a first landmark in the environment;
anchor an augmented reality object to the first landmark;
send first anchoring information, to the user device, the first anchoring information including identification of the first landmark and a position of the augmented reality object relative to the first landmark and the user device;

determine whether the first landmark is present in a second image, the second image from a second device and corresponding to the environment;

assign a second landmark associated with a second object in the environment based on the first landmark not being present in the second image, wherein the second object is present in both the first image and the second image;

anchor the augmented reality object to the second landmark; and send second anchoring information to the second device, wherein the second anchoring information includes identification of the second landmark and a position of the augmented reality object relative to the second landmark and the second device.

20. The at least one non-transitory computer-readable storage medium of claim 19, further comprising instructions to:

determine whether the second landmark is present in a subsequent image, the subsequent image from a subsequent device and corresponding to the environment; and send third anchoring information to the subsequent device based on the determination that the second landmark is present in the subsequent image, wherein the third anchoring information includes identification of the second landmark and a position of the augmented reality object relative to the second landmark and the subsequent device.

21. The at least one non-transitory computer readable storage medium as recited in claim 19, further comprising instructions to:

present the augmented reality object with the first landmark for display.

22. The at least one non-transitory computer readable storage medium as recited in claim 21, further comprising instructions to:

track movements of the user device relative to the first landmark; and provide an indicator to the user device identifying a direction for a next image to be captured, the next image to be used in determining whether the first landmark is present in the next image.

23. The at least one non-transitory computer readable storage medium as recited in claim 19, wherein identifying an object in the first image is based on ability to delineate in the object at least a color or a shape capable of being tracked in successive images of the environment.

24. The at least one non-transitory computer readable storage medium as recited in claim 19, wherein assigning the object as the first landmark in the environment is based at least in part on a determination of relative permanence of the object within the environment.

* * * * *

UNITED STATES PATENT AND TRADEMARK OFFICE
CERTIFICATE OF CORRECTION

PATENT NO. : 10,262,464 B2  
APPLICATION NO. : 15/395222  
DATED : April 16, 2019  
INVENTOR(S) : Glen J. Anderson Page 1 of 1

It is certified that error appears in the above-identified patent and that said Letters Patent is hereby corrected as shown below:

On the Title Page

On page 2, in Column 1, item (56), under "Other Publications", Line 4, delete "usign" and insert --using-- therefor On page 2, in Column 1, item (56), under "Other Publications", Line 8, delete "Suva," and insert --Suya,-- therefor Signed and Sealed this  
Twenty-first Day of April, 2020

Andrei Iancu  
*Director of the United States Patent and Trademark Office*